US008094555B2

(12) United States Patent
Ward et al.

(10) Patent No.: US 8,094,555 B2
(45) Date of Patent: Jan. 10, 2012

(54) DYNAMIC WEIGHTED-FAIR LOAD-BALANCING

(75) Inventors: David D. Ward, Los Gatos, CA (US); Clarence Filsfils, Brussels (BE); Stefano B. Previdi, Rome (IT); Jean-Philippe Vasseur, Dunstable, MA (US)

(73) Assignee: Cisco Technology, Inc., San Jose, CA (US)

( * ) Notice: Subject to any disclaimer, the term of this patent is extended or adjusted under 35 U.S.C. 154(b) by 517 days.

(21) Appl. No.: 11/604,461

(22) Filed: Nov. 27, 2006

(65) Prior Publication Data

US 2008/0123532 A1    May 29, 2008

(51) Int. Cl.
H04J 1/16    (2006.01)
(52) U.S. Cl. ..................................... 370/230.1; 370/238
(58) Field of Classification Search .................. 370/229, 370/235, 238, 238.1, 351, 352, 356, 464, 370/465, 468, 230, 230.1
See application file for complete search history.

(56) References Cited

U.S. PATENT DOCUMENTS

| | | | |
|---|---|---|---|
| 6,424,624 B1 | 7/2002 | Galand et al. | |
| 6,493,317 B1 | 12/2002 | Ma | |
| 6,724,722 B1 * | 4/2004 | Wang et al. | 370/229 |
| 6,760,314 B1 * | 7/2004 | Iwata | 370/254 |
| 6,775,231 B1 | 8/2004 | Baker et al. | |
| 6,778,496 B1 * | 8/2004 | Meempat et al. | 370/230 |
| 6,831,895 B1 * | 12/2004 | Ji et al. | 370/237 |
| 6,934,249 B1 | 8/2005 | Bertin et al. | |
| 7,058,016 B1 | 6/2006 | Harper | |
| 7,123,620 B1 | 10/2006 | Ma | |
| 7,197,573 B1 * | 3/2007 | Jacobson et al. | 709/239 |
| 2003/0165117 A1 * | 9/2003 | Garcia-Luna-Aceves et al. | 370/238 |
| 2004/0049595 A1 * | 3/2004 | Sun et al. | 709/238 |
| 2005/0074001 A1 | 4/2005 | Mattes et al. | |
| 2005/0265239 A1 | 12/2005 | Previdi et al. | |
| 2006/0133282 A1 * | 6/2006 | Ramasamy | 370/238 |
| 2009/0185491 A1 * | 7/2009 | Schollmeier et al. | 370/238 |
| 2009/0323535 A1 * | 12/2009 | Kalkunte et al. | 370/238 |

OTHER PUBLICATIONS

Villamizar, Curtis, Internet Draft, entitled "OSPF Optimized Multipath (OSPF-OMP)", Internet Engineering Task Force, draft-ietf-ospf-omp-02.txt, Feb. 24, 1999, pp. 1-36.
Perlman, Radia, "Interconnections Second Edition: Bridges, Routers, Switches, and Internetworking Protocols," Chapter 12.2.4, Sep. 1999, pp. 317-319.

* cited by examiner

*Primary Examiner* — Kwang B Yao
*Assistant Examiner* — Obaidul Huq
(74) *Attorney, Agent, or Firm* — Cesari and McKenna, LLP

(57) ABSTRACT

In one embodiment, a node identifies a plurality of equal cost best paths to a destination, the best paths having one or more associated links. The node receives dynamic link utilization information for the associated links, and determines an amount of traffic to the destination to forward over each of the equal cost best paths, the amount being dynamically dependent upon the dynamic link utilization of the associated links for each equal cost best path.

22 Claims, 7 Drawing Sheets

DYNAMIC WEIGHTED-FAIR LOAD-BALANCING

TECHNICAL FIELD

The present disclosure relates generally to computer networks, and, more particularly, to forwarding data in a computer network.

BACKGROUND

In computer networks, packets of data may be sent from a source to a destination via a network of elements comprising links and nodes according to one or more routing protocols, e.g., link state protocols. Link state protocols generally rely on a routing algorithm resident at each node to construct an optimum (e.g., "best" or "shortest") route to each available node of the network based on one or more link costs along the path, e.g., using a shortest path first (SPF) algorithm. The results of the SPF are managed by a routing process, and based on these results a forwarding process controls the forwarding of packets appropriately over the shortest route (path).

Generally, data (or "traffic," e.g., in the form of packets) is forwarded along a single link from a forwarding node to an adjacent (receiving) node based on the SPF algorithm. However, there are certain instances where two or more equal cost best paths are available (e.g., an Equal Cost Multiple Path, or ECMP, as will be understood by those skilled in the art). In these instances, the forwarding node will attempt to implement load-balancing, in which the traffic load is shared equally between the links. That is, assuming two equal cost best paths, the forwarding node may conventionally load-balance the traffic equally ("fairly") such that each path receives half (1/the number of paths) of the traffic.

Often, however, the equal cost best paths may not be equal paths beyond their equal cost. For instance, other measurements/attributes of the equal cost best paths (e.g., of the links/nodes along the paths) may be different. For example, while the paths may have the same cost to reach the destination, certain nodes/links along the paths may have better (or worse) characteristics that may affect the forwarding of traffic (e.g., an ability to handle the traffic, delays, error rates, etc.). These characteristics may be the result of physical configurations (i.e., "static" configurations, such as link capacity/bandwidth, etc.), or the result of different network conditions (e.g., congestion, delay, etc.) along each path, which may be continuously changing (i.e., are "dynamic"). Current "fair" load-balancing techniques inefficiently address these other measurements/attributes (e.g., by not addressing them at all), thus potentially leading to "unfair" load-balancing among the paths with respect to these other measurements/attributes.

BRIEF DESCRIPTION OF THE DRAWINGS

The above and further advantages of the invention may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a node identifies a plurality of equal cost best paths to a destination, the best paths having one or more associated links. The node receives dynamic link utilization information for the associated links, and determines an amount of traffic to the destination to forward over each of the equal cost best paths, the amount being dynamically dependent upon the dynamic link utilization of the associated links for each equal cost best path.

Description

A computer network is a geographically distributed collection of nodes interconnected by communication links and segments for transporting data between end nodes, such as personal computers and workstations. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Since management of interconnected computer networks can prove burdensome, smaller groups of computer networks may be maintained as routing domains or autonomous systems. The networks within an autonomous system (AS) are typically coupled together by conventional "intradomain" routers configured to execute intradomain routing protocols, and are generally subject to a common authority. To improve routing scalability, a service provider (e.g., an ISP) may divide an AS into multiple "areas" or "levels." It may be desirable, however, to increase the number of nodes capable of exchanging data; in this case, interdomain routers executing interdomain routing protocols are used to interconnect nodes of the various ASes. Moreover, it may be desirable to interconnect various ASes that operate under different administrative domains. As used herein, an AS, area, or level is generally referred to as a "domain."

Figure 1:
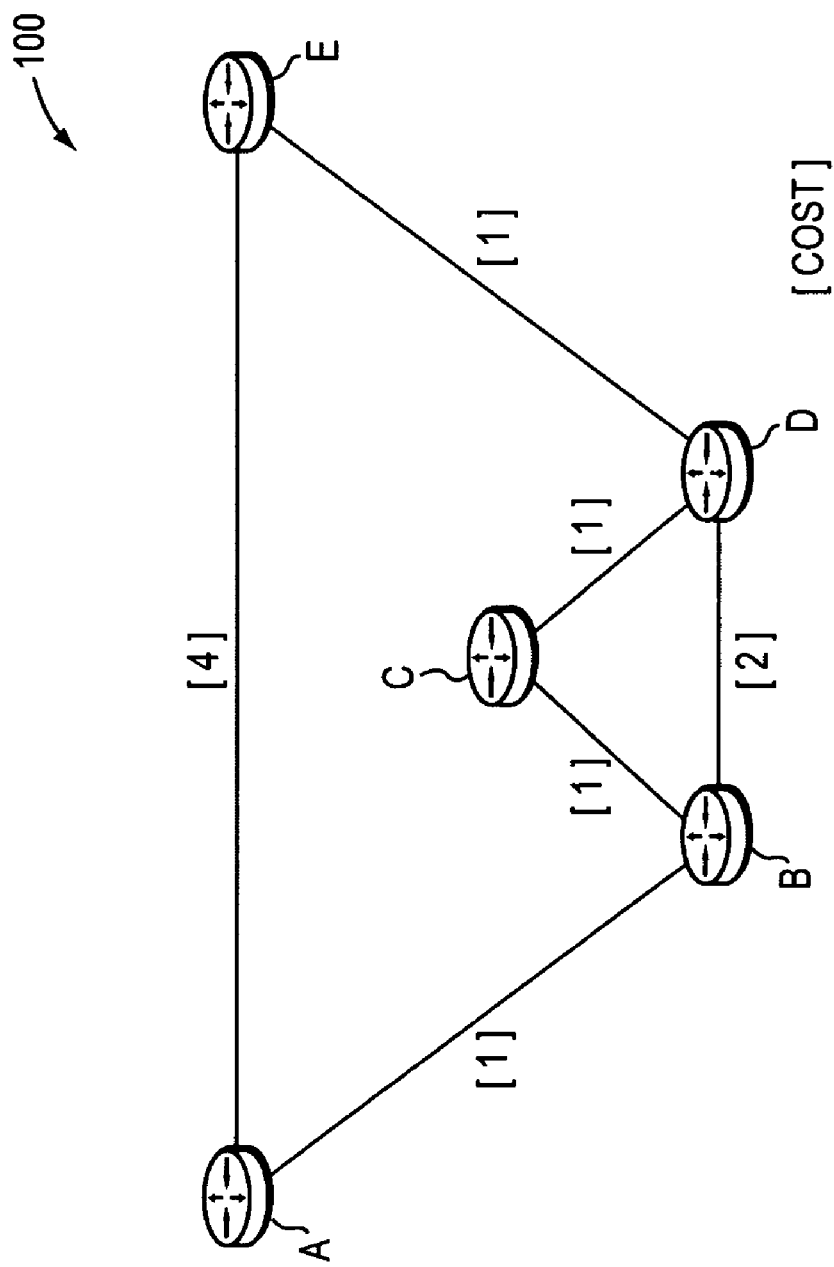
FIG. 1 illustrates an example computer network.

FIG. 1 is a schematic block diagram of an example computer network 100 illustratively comprising nodes (e.g., routers) A-E interconnected by links as shown. Those skilled in the art will understand that any number of nodes, routers, links, etc. may be used in the computer network, and that the view shown herein is for simplicity. Those skilled in the art will also understand that while the present invention is described generally within an AS (e.g., areas/levels), it may apply to any network configuration that may be applicable to one or more embodiments described herein. Data packets (e.g., traffic) may be exchanged among the nodes of the computer network 100 using predefined network communication protocols such as the Transmission Control Protocol/ Internet Protocol (TCP/IP), User Datagram Protocol (UDP), Asynchronous Transfer Mode (ATM) protocol, Frame Relay protocol, Internet Packet Exchange (IPX) protocol, etc.

Figure 2:
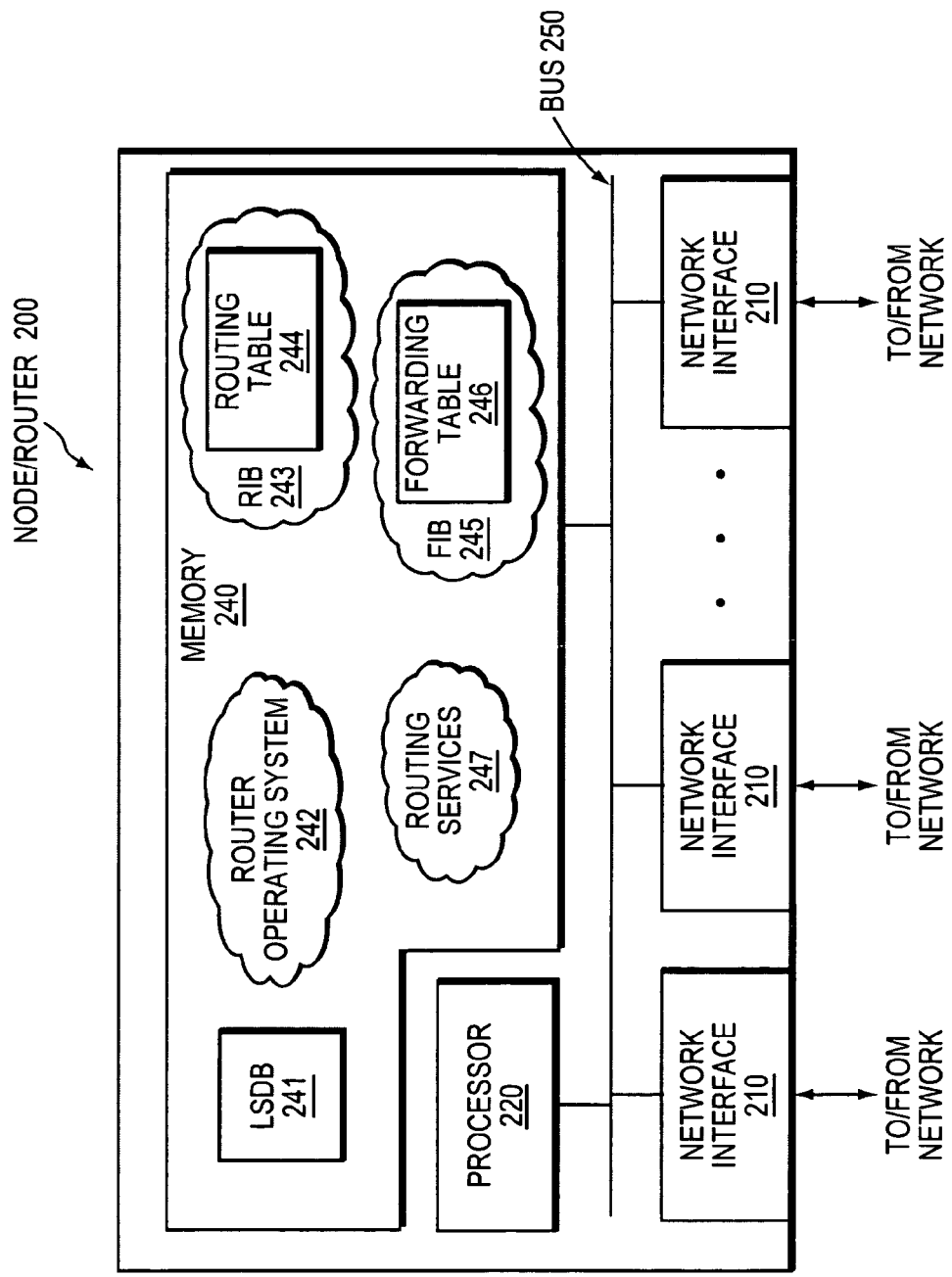
FIG. 2 illustrates an example network device/node.

FIG. 2 is a schematic block diagram of an example node/ router 200 that may be advantageously used with one or more embodiments described herein. The node comprises a plurality of network interfaces 210 (illustratively labeled as the connecting nodes, e.g., node A may reach node E via interface AE, etc.), one or more processors 220, and a memory 240 interconnected by a system bus 250. The network interfaces 210 contain the mechanical, electrical and signaling circuitry for communicating data over physical links coupled to the network 100. The network interfaces may be configured to transmit and/or receive data using a variety of different communication protocols, including, inter alia, TCP/IP, UDP, ATM, synchronous optical networks (SONET), wireless protocols, Frame Relay, Ethernet, Fiber Distributed Data Interface (FDDI), etc. Notably, a physical network interface 210 may also be used to implement one or more virtual network interfaces, such as for Virtual Private Network (VPN) access, known to those skilled in the art.

The memory 240 comprises a plurality of storage locations that are addressable by the processor 220 and the network interfaces 210 for storing software programs and data structures associated with the present invention. The processor 220 may comprise necessary elements or logic adapted to execute the software programs and manipulate the data structures, such as a link state database (LSDB) 241, routing table 244, and forwarding table 246. A router operating system 242 (e.g., the Internetworking Operating System, or IOS™, of Cisco Systems, Inc.), portions of which are typically resident in memory 240 and executed by the processor, functionally organizes the node by, inter alia, invoking network operations in support of software processes and/or services executing on the router. These software processes and/or services may comprise routing services 247, routing process/routing information base (RIB) 243, and forwarding process/forwarding information base (FIB) 245. It will be apparent to those skilled in the art that other processor and memory means, including various computer-readable media, may be used to store and execute program instructions pertaining to the inventive technique described herein.

Routing services 247 contain computer executable instructions executed by processor 220 to perform functions provided by one or more routing protocols, such as the Interior Gateway Protocol (IGP) (e.g., Open Shortest Path First, "OSPF," and Intermediate-System-to-Intermediate-System, "IS-IS"), the Border Gateway Protocol (BGP), etc., as will be understood by those skilled in the art. These functions may be configured to allow RIB 243 to manage routing table 244 containing, e.g., data used to make routing decisions, and to allow FIB 245 to manage forwarding table 246 containing, e.g., data used to make forwarding decisions. Those skilled in the art will understand that the routing table and forwarding table need not be organized as tables, and alternatively may be another type of applicable data structure. Notably, routing services 247 may also perform functions related to virtual routing protocols, such as maintaining VRF instances (not shown) as will be understood by those skilled in the art.

Changes in the network topology within the local domain (network 100) may be communicated among routers 200 within the network 100 using IGP services, such as the conventional OSPF and IS-IS link-state protocols. Suppose, for example, that a communication link fails or a cost value associated with a network node changes. Once the change in the network's state is detected by one of the routers, that router may flood an IGP advertisement/message communicating the change to the other routers in the network. In this manner, each of the routers eventually "converges" to an identical view of the network topology.

Figure 3:
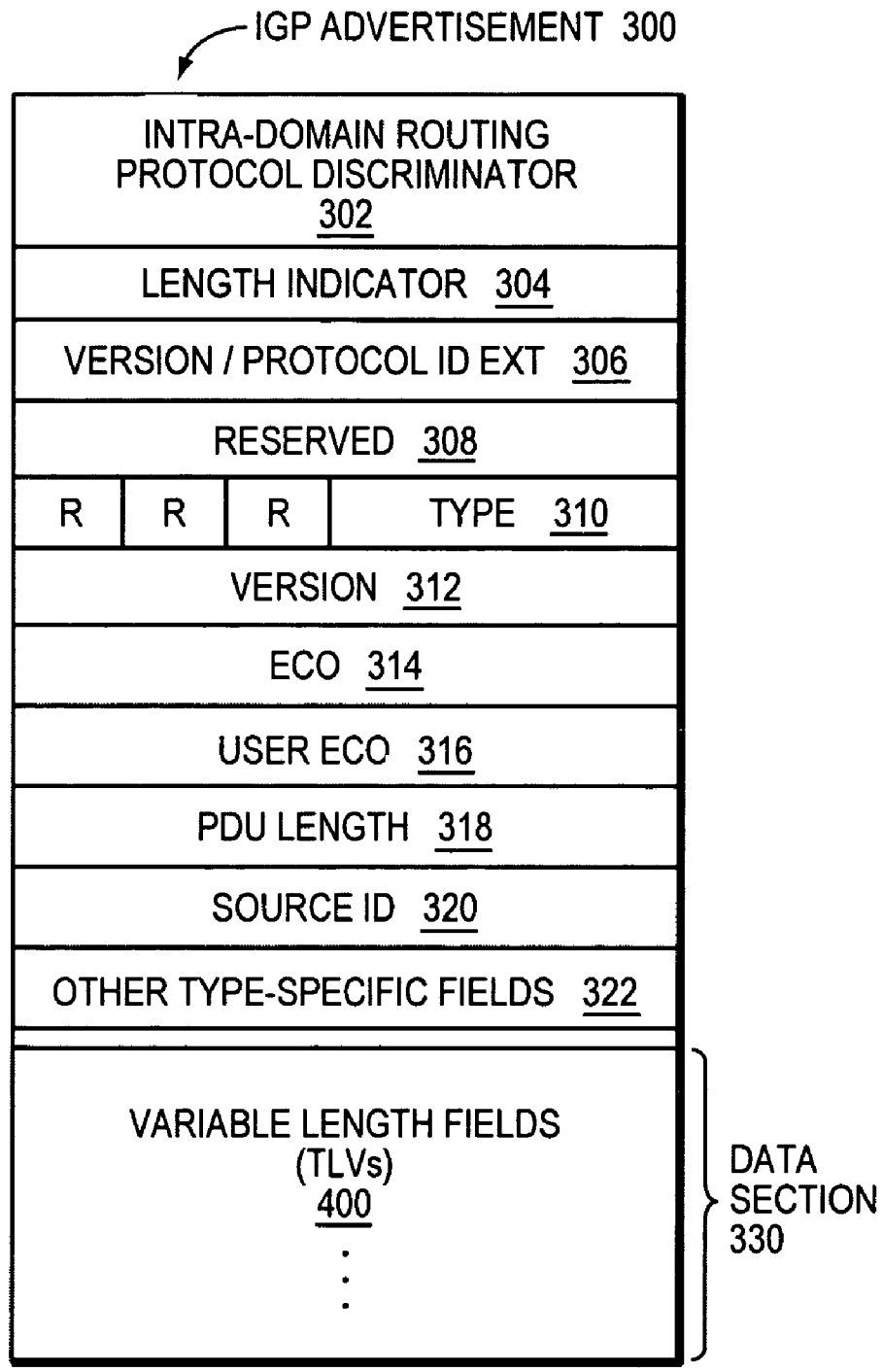
FIG. 3 illustrates an example IGP advertisement.

FIG. 3 illustrates an example IGP advertisement 300 that may be flooded by the routers 200. Illustratively, IGP advertisement 300 is shown as an IS-IS link state packet. Those skilled in the art will understand, however, that other IGP advertisements may be used in accordance with the present invention, such as, e.g., OSPF link state advertisements, etc. The advertisement 300 includes an intra-domain routing protocol discriminator field 302 that stores a value identifying the specific protocol of the message (e.g., IS-IS), and a length indicator field 304 that stores a value indicating the length of the standard header for the advertisement. Also, a version/ protocol ID extension (ext) field 306 may be used to further store a value defining the particular version of the protocol. Reserved field 308 and "R" fields are reserved for future use with the protocol, as are the ECO and User ECO fields 314 and 316, all of which are illustratively ignored by the receiving router until directed for decoding in future versions of the protocol.

A type field 310 (and corresponding version field 312) stores a value indicating the type (and version) of advertisement 300 being transmitted, which may define the existence of other type-specific fields 322 within the advertisement. For example, the type of advertisement may be a link state packet, a "Hello" packet, etc., as will be understood by those skilled in the art. The PDU length field 318 stores a value indicating the length of the entire PDU (Protocol Data Unit, or advertisement 300), including the header, type-specific fields, and data fields. A source ID field 320 stores a value that identifies the router that generated and originally broadcast the advertisement 300.

The other type-specific fields 322 may include any number of fields as defined by the protocol, such as checksum fields, maximum area address fields, etc., as understood by those skilled in the art. For example, a sequence-number field (not shown) may store a sequence number indicating the relative version of the advertisement 300. Typically, the sequence number stored in the field is incremented, e.g., by one, for every new version of the advertisement. The advertisement 300 is therefore considered "stale" (invalid) if its sequence number is less than the sequence number stored in a previously-received version of the advertisement, i.e., generated by the same advertising node. Accordingly, the routers 200 may be configured to store and forward only the most recent version of an advertisement, e.g., the version having the largest sequence number. A remaining lifetime field (not shown) may also be used to store a value that may be used for determining whether the advertisement 300 is valid. The remaining lifetime value is typically initialized to a non-zero integer value, often in units of seconds. The remaining lifetime value may be decremented, e.g., by one every second, until the remaining lifetime value reaches zero, thereby indicating that the advertisement has become invalid. That is, every router 200 that stores or floods the advertisement 300 continuously ages the packet until the remaining lifetime value equals zero. Those skilled in the art will appreciate that other aging mechanisms alternatively may be used, such as incrementing the advertisement remaining lifetime value from an initial value, e.g., equal to zero, until the remaining lifetime value reaches a known upper limit.

The data section 330 includes one or more variable length fields 400, which each have a specific type (or code), length, and value (TLV) as described further herein. For example, to advertise network topology, one or more pairs of neighboring-node fields (not shown) and cost fields (not shown) may be used. The neighboring-node fields may store a value, such as an address, indicating a network node that is directly accessible from the intermediate node identified in the source ID field 320. The cost field may store a value that has been associated, e.g., by the advertising node, with the network node identified in the neighboring-node field. It is noted that in other embodiments, a single neighboring node may be associated with a plurality of cost values. Other routing information may also be included in the variable length fields 400 of the IGP advertisement 300, such as checksum values, padding fields, proprietary fields, etc., and a dynamic link utilization information field (e.g., in a Link Attribute TLV), described further below. Generally, the received IGP advertisements are stored in LSDB 241 of the router 200.

In particular, the TLV encoded format is used to identify a type (T) of information being communicated (conveyed), a length (L) of information to be conveyed, and a value (V) of the actual information conveyed. The length (L) parameter contained in the length field is typically implementation-specific and can denote the length from the beginning of the Type field of the object to the end. However, the length generally denotes the length of the Value (V) field and not the Type (T) or Length (L) fields.

Figure 4:
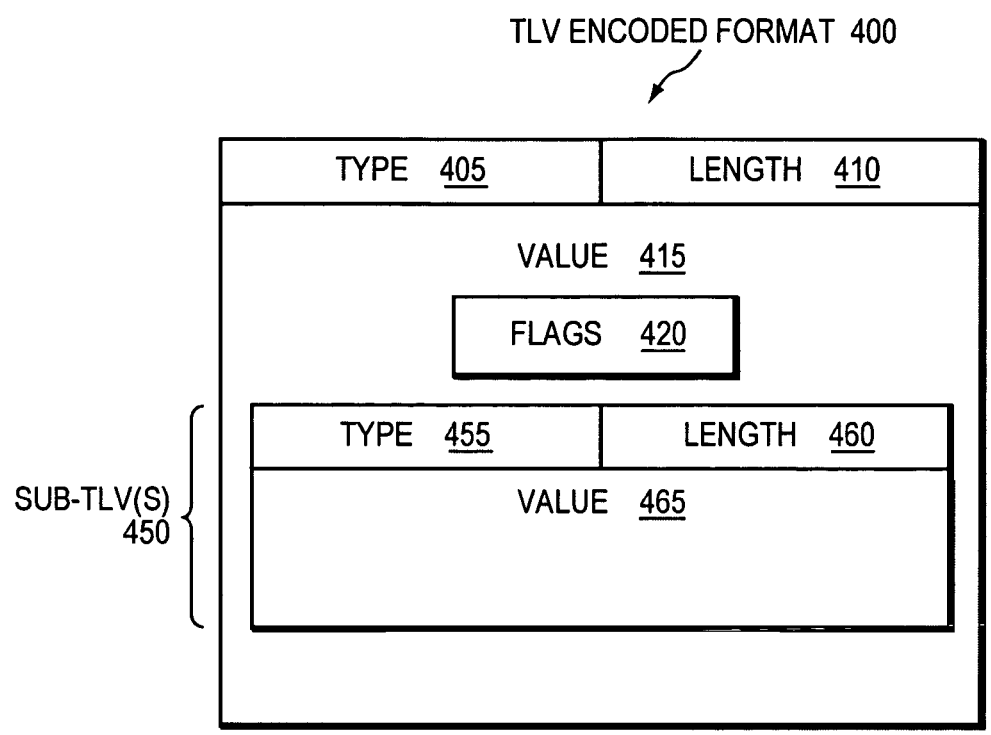
FIG. 4 illustrates an example TLV format.

FIG. 4 is a schematic block diagram illustrating the TLV encoded format 400 that may be advantageously used with the present invention. The TLV 400 may be used for a variable length field contained in an IGP advertisement 300, or other protocol messages in accordance with the present invention. The TLV 400 is organized to include a Type field 405 containing a predetermined type value indicating the type of data contained in the TLV 400, and a Length field 410, which is a variable length value. The TLV encoded format 400 may also comprise one or more non-ordered sub-TLVs 450 carried within the TLV "payload" (e.g. Value field 415), each having a Type field 455, Length field 460, and Value field 465. Notably, other information may be contained within Value field 415 (and/or 465), such as, e.g., one or more flags in Flags field 420. The fields of the TLV 400 and sub-TLV(s) 450 are used in a variety of manners, including as described herein, according to the present invention.

As noted, IGP advertisements 300 are usually flooded until each intermediate network IGP node 200 has received an IGP advertisement from each of the other interconnected intermediate nodes, which may be stored in the LSDB 241. Then, each of the IGP nodes (e.g., in a link-state protocol) can construct the same "view" of the network topology by aggregating the received lists of neighboring nodes and cost values. To that end, each IGP node may input this received routing information to a "shortest path first" (SPF) calculation that determines the lowest-cost network paths that couple the intermediate node with each of the other network nodes. For example, the Dijkstra algorithm is a conventional technique for performing such a SPF calculation, as described in more detail in Section 12.2.4 of the text book *Interconnections Second Edition*, by Radia Perlman, published September 1999, which is hereby incorporated by reference as though fully set forth herein. Each IGP node updates the routing information stored in its local routing table 244 based on the results of its SPF calculation. More specifically, the RIB 243 updates the routing table 244 to correlate destination nodes with next-hop interfaces associated with the lowest-cost paths to reach those nodes, as determined by the SPF calculation (notably, creating a "shortest path tree" or SPT, as will be understood by those skilled in the art).

As noted, there are occasions where a forwarding node (e.g., node A) may identify a plurality of equal cost best (shortest) paths to reach a destination (e.g., Equal Cost Multiple Paths, ECMPs, as will be understood by those skilled in the art). For example, illustrative link costs are shown in FIG. 1, e.g., in the [x] notation by each link. Accordingly, node A may determine that to reach node E, two equal cost best paths exist, e.g., path A-E and A-B-C-D-E/A-B-D-E, at a cost of "4". Notably, path A-B-C-D-E and A-B-D-E are the same "path" to the forwarding node A because the same interface (AB) is used for both, as will be understood by those skilled in the art. Illustratively, RIB 243 enters the plurality of equal cost best paths into the routing table 244 (e.g., as ECMPs), along with their associated path cost.

The results of the SPF calculation (the SPT) containing the equal cost best paths may then be propagated from the RIB and routing table to the FIB and forwarding table as will be understood by those skilled in the art. Conventionally, for ECMPs, the forwarding process (e.g., FIB) attempts to equally load-balance the forwarding of traffic to the destination based on the number of equal cost best paths (e.g., 50/50 for two paths). As noted, however, due to network conditions, e.g., dynamic conditions, the forwarding may be equal, but not "fair" based on one path's ability to handle the traffic over another path's.

Dynamic Weighted-Fair Load-Balancing

According to one or more embodiments of the disclosure, a node identifies a plurality of equal cost best paths to a destination, the best paths having one or more associated links. The node receives dynamic link utilization information for the associated links, and determines an amount of traffic to the destination to forward over each of the equal cost best paths, the amount being dynamically dependent upon the dynamic link utilization of the associated links for each equal cost best path.

Operationally, a forwarding node (e.g., node A) utilizes an SPF algorithm to produce an SPT in a conventional manner to identify a plurality of equal cost best paths as described above. In accordance with one or more embodiments described herein, additional information corresponding to the dynamic link utilization of the links along the path is also maintained within the routing table. The dynamic link utilization information is illustratively advertised by nodes/routers 200 of the network 100 through the use of IGP advertisements 300. For instance, a Link Attribute TLV 400 may comprise one or more novel sub-TLVs 450 corresponding to one or more measurements of link utilization. Example measurements of link utilization comprise, inter alia, current utilized bandwidth, current available bandwidth, current delay, current error rate, current jitter, etc.

Illustratively, the FIB 245 determines the forwarding information to include within forwarding table 246 for the equal cost best paths in the routing table 244. Rather than utilizing conventional "fair" load-balancing techniques (e.g., equal distribution to the paths based on the number of paths), one or more embodiments described herein apply the additional dynamic link utilization information to allow for dynamic "weighted-fair" load-balancing of the traffic. In particular, the forwarding of traffic is dependent (dynamically) upon a "weakest" link of the path. That is, the weakest link is generally the link having the worst link utilization information along the path, e.g., with the lowest available bandwidth, the highest delay, etc., along the path.

Figure 5:
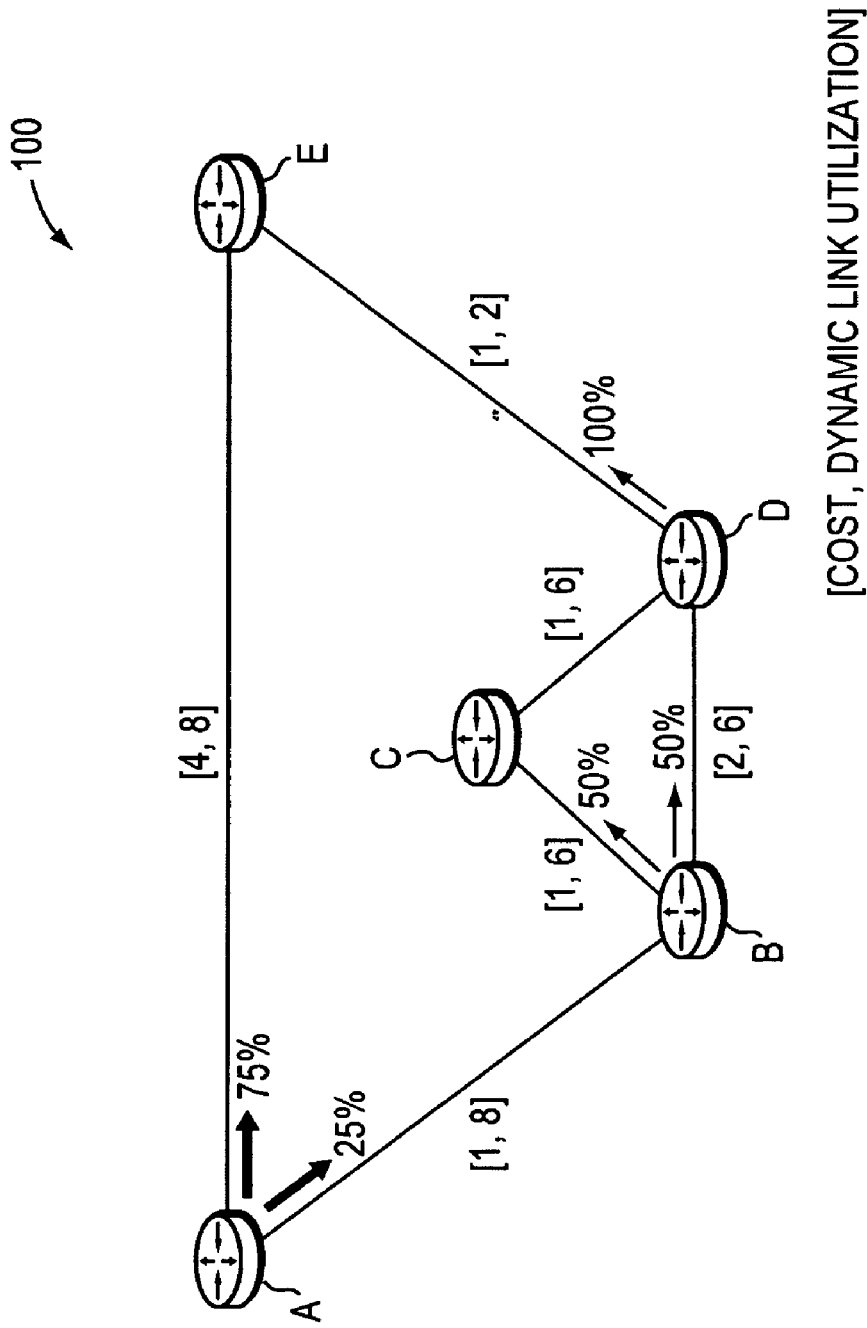
FIG. 5 illustrates an example computer network with dynamic weighted-fair load balancing.

FIG. 5 illustrates an example computer network 100 as in FIG. 1 showing illustrative dynamic link utilization information and corresponding traffic forwarding from node A to node E in accordance with one or more embodiments described herein. For instance, in addition to the cost values in FIG. 1, illustrative dynamic link utilization information for each link is also shown next to the cost (e.g., within the [x,y] notation by each link). Assume, for example, that the dynamic link utilization values correspond to a current bandwidth availability, e.g., in kilobits per second (kbps). Those skilled in the art will understand that the values shown are merely examples, and are used for simplicity herein. According to the illustrative example, then, the weakest link utilization information for each equal cost best path may be determined as 8 kbps for path A-E, and 2 kbps for path A-B-C-D-E (and A-B-D-E), notably, due to the lowest available bandwidth value of 2 kbps on link D-E accordingly.

In accordance with one or more embodiments described herein, the forwarding node (node A) determines an amount of traffic to the destination (node E) to forward over each of the plurality of equal cost paths (e.g., over interface AE and interface AB, accordingly). Specifically, the amount of traffic forwarded over each path is dynamically dependent upon the dynamic link utilization of the links of the path, e.g., the weakest link. By comparing the dynamic link utilization information for each of the plurality of equal cost best paths, the forwarding node may determine a "weighted-fair" load-balancing for the paths, such as an amount of traffic for each path proportional to the dynamic link utilization of the paths. For example, assuming the values above in FIG. 5, 75% of traffic to node E may be sent over the path A-E (interface AE) (8 kbps available bandwidth), while the remaining 25% of traffic to node E may be sent over path A-B-C-D-E/A-B-D-E (interface AB) (2 kbps available bandwidth). Upon determining the amounts of traffic to forward over each path, the forwarding table 246 maintains this amount for use when forwarding traffic. When forwarding traffic, a hashing function or other known way to unequally distribute the forwarding of traffic according to the determined amounts may be used accordingly.

In accordance with one or more embodiments described herein, other information may be used in addition to the dynamic link utilization information to determine the weighted-fair load-balancing of traffic over a plurality of equal cost best paths. For example, load capacity (static) may be used as an additional measurement upon which the determination may be made. As shown in FIG. 5, node B (and each other node of the network 100) may also utilize the techniques described herein for dynamic weighted-fair load-balancing. As such, node B may determine that it also has a plurality of equal cost best paths to reach node E (and as those skilled in the art will understand, node D). Assume in the example that the dynamic link utilization information for the links B-C-D and B-D are equal (e.g., 6 kbps of available bandwidth). Because the link utilizations are the same, node B may send 50% of the received traffic for node E along each path. However, by applying other information, such as static bandwidth capacities, configured costs, etc. (static), of the links B-C-D and B-D (not shown), the "tie" may be broken. An example of weighted-fair load-balancing for static values is described in commonly owned, copending U.S. patent application Ser. No. 10/858,920, entitled METHOD AND APPARATUS FOR FORWARDING DATA IN A DATA COMMUNICATIONS NETWORK, filed by Previdi et al. on Jun. 1, 2004, now published as U.S. Patent Application Publication No. US2005/0265239A1 on Dec. 1, 2005, the contents of which are hereby incorporated by reference in their entirety.

In addition to being used for breaking ties, static link information (e.g., capacity) may be used in combination with dynamic link utilization information to determine amounts of traffic to forward over each of the plurality of equal cost best paths. For example, various algorithms may be used to combine the static and dynamic information, such as, e.g., applying "scores" to the information (e.g., on a scale of 1-10), tallying the combined scores, and forwarding traffic over each of the equal cost best paths according to the scores. Those skilled in the art will understand that the use of scores is merely an example, and that other techniques to combine additional static and dynamic information may be used in accordance with one or more embodiments described herein.

As conditions in the network change, thus changing the dynamic link utilization information, the node (e.g., node A) may receive new IGP advertisements 300 that advertise the new (updated) link utilization information. Accordingly, the receiving node (the forwarding node) may adjust the amount of traffic to forward over each equal cost best path based on the new information. In this way, the forwarding node (node A) dynamically maintains a dynamic weighted-fair load-balancing of traffic.

Notably, nodes 200 that send the IGP advertisements 300 containing dynamic link utilization information (e.g., in an appropriate sub-TLV 450 of a Link Attribute TLV 400) may limit the frequency of advertisements in order reduce network oscillations and churn. For instance, prior to sending updated dynamic link utilization information, the sending node (e.g., node C) determines first whether the change is more than a configurable threshold, that is, if the change merits transmission of an update. For example, if node C determines that its utilization of link C-D changes from 6 kbps of available bandwidth to 7 kbps, a threshold of 2 kbps change (or 33%, etc.) would prevent node C from advertising the change. If the utilization changes to 3 kbps, for example, node C may determine that an update is merited, and may send the corresponding IGP advertisement 300 accordingly.

Moreover, the receiving node of the IGP advertisements (e.g., node A) may also reduce network oscillations/churn. For instance, the receiving node may be configured to always adjust the forwarding of traffic based on a new IGP advertisement 300 having new dynamic link utilization information. However, it may be advantageous to configure a threshold and/or timer to account for many possible (e.g., small) changes in information and in a short amount of time. For example, a threshold similar to the sending node may be used to determine whether the receiving node should adjust the forwarding (e.g., only adjusting the forwarding if the change is great enough to merit the adjustment). Alternatively or in addition, a timer may be used by the receiving node to prevent the node from adjusting the forwarding too often within that period of time. That is, use of the timer (e.g., of 10 seconds) may allow for multiple IGP advertisements to be received in the event a change in the network affects more than one link/node accordingly. For instance, a new data flow within the network may affect the dynamic link utilization of multiple nodes/links such that each node may send an IGP advertisement 300 to the receiving node. In this case, it would be better to wait until most of the advertisements were received prior to making a corresponding load-balancing determination.

Figure 6:
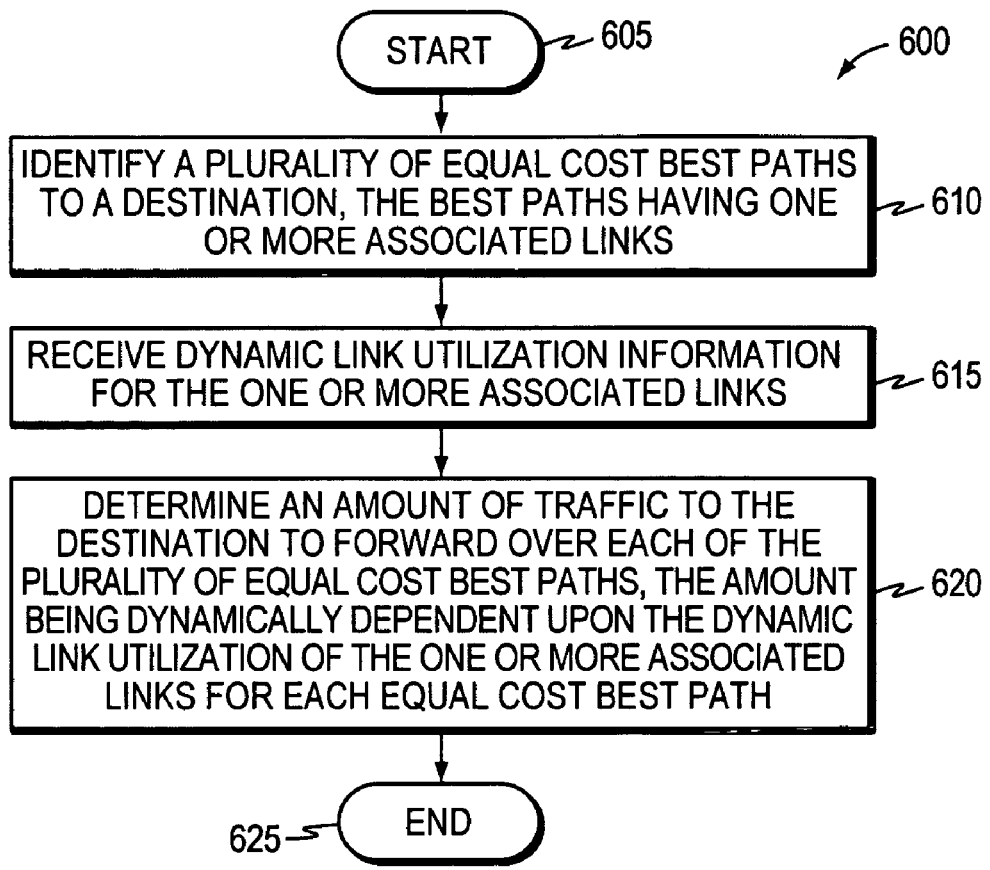
FIG. 6 illustrates an example procedure for dynamic weighted-fair load balancing.

FIG. 6 illustrates an example procedure for forwarding traffic over paths in accordance with one or more embodiments described herein. The procedure 600 starts at step 605, and continues to step 610, where a node 200 (e.g., node A)

identifies a plurality of equal cost best paths to a destination, the best paths having one or more associated links. For example, as described above, for node A to reach node E, two equal cost paths exist (e.g., interface AE and interface AB). In step 615, the node receives (or, notably, has already received) dynamic link utilization information (e.g., current available bandwidth) for the associated links, such as from an IGP advertisement 300 (e.g., a Link Attribute TLV 400 therein). Based on this information, the node determines an amount of traffic to the destination to forward over each of the equal cost best paths in step 620, the amount being dynamically dependent upon the dynamic link utilization of the associated links for each equal cost best path, as described above. For example, node A forwards 75% of the traffic to node E over interface AE, and 25% of the traffic over interface AB. Also as described above, node B may perform load-balancing over its two equal cost best paths to E (e.g., B-C-D and B-D) in a similar or other manner. The procedure 600 ends in step 625.

Figure 7:
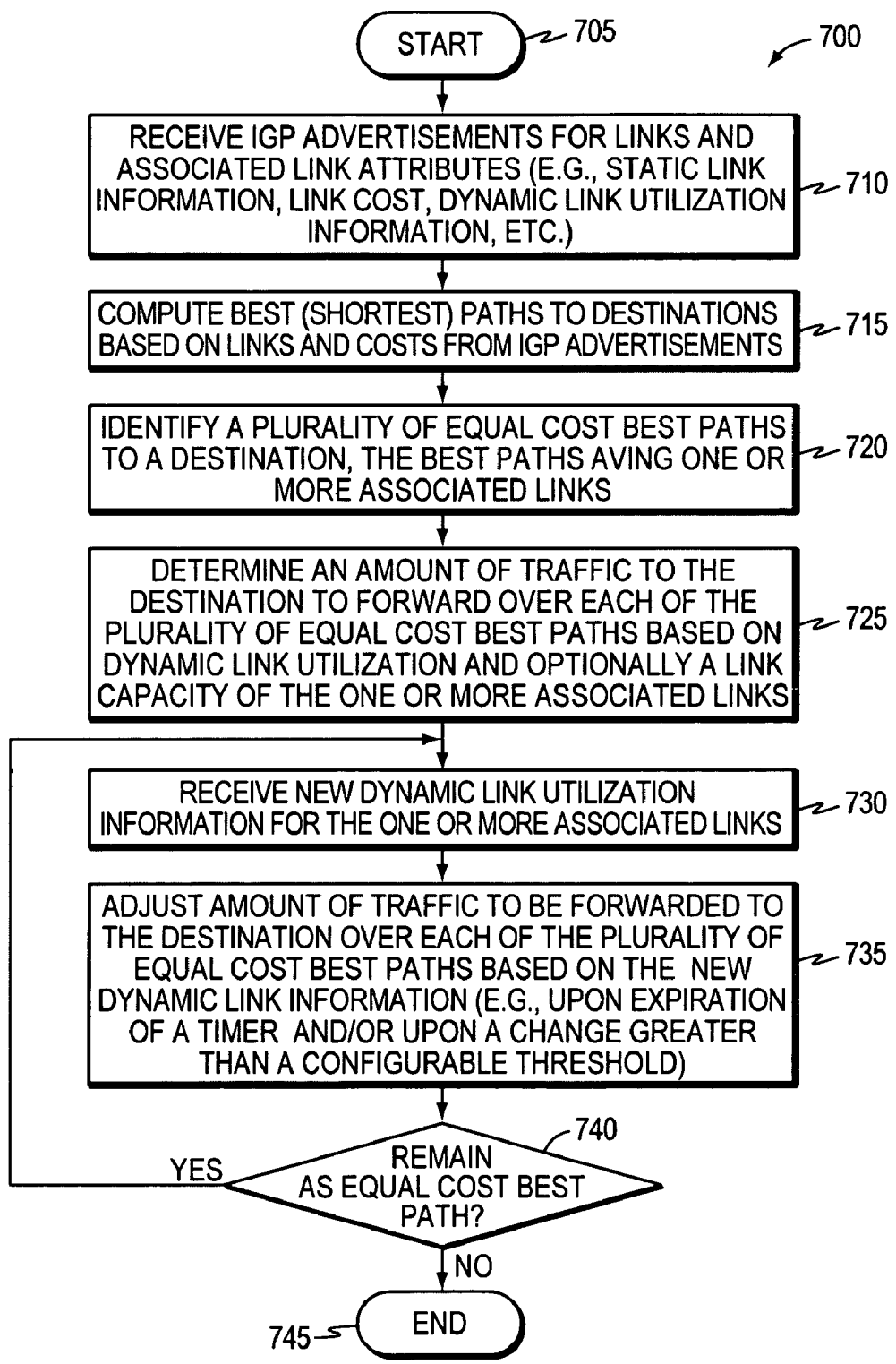
FIG. 7 illustrates another example procedure for dynamic weighted-fair load balancing.

FIG. 7 illustrates another example procedure for forwarding traffic over paths in accordance with one or more embodiments described herein. The procedure 700 starts at step 705, and continues to step 710, where the node 200 (e.g., node A) receives IGP advertisements 300 for links and associated link attributes (e.g., static link information, link cost, dynamic link utilization information, etc.). In step 715, the node computes the best (shortest) paths to destinations based on the links and their costs from the IGP advertisements, e.g., using an SPF algorithm as described above, and storing the results in routing table 244. A plurality of equal cost best paths to a destination is identified in step 720. The node then determines an amount of traffic to the destination to forward over each of the equal cost best paths in step 725, e.g., based on dynamic link utilization, and optionally a link capacity of the associated links as described above.

Traffic may then be forwarded (e.g., based on corresponding forwarding table entries 246) according to the determined amounts until the node receives new dynamic link utilization information for the associated links in step 730. In step 735, the node may correspondingly adjust the amount of traffic to be forwarded to the destination over each of the equal cost best paths based on the new dynamic link information (e.g., upon expiration of the timer and/or upon a change greater than a configurable threshold, as mentioned above). So long as the equal cost best paths remain as such (i.e., the SPT does not change based on new static costs, failures, additions, etc.) in step 740, the node continues to forward traffic and receive new dynamic link utilization information in step 730. Otherwise, the procedure 700 ends in step 745, for example, and the node recomputes a new SPT, which may, but need not, result in other equal cost best paths.

Advantageously, the novel techniques described herein efficiently forward traffic over equal cost best paths in a computer network. By determining a weighted-fair distribution of traffic for each of the equal cost best paths, the novel techniques allow for improved load-balancing across parallel (equal cost) paths with unequal link attributes (e.g., link utilization, capacity, etc.). In particular, adjusting the amount of traffic to forward over each path based on the dynamic link utilization information allows for a more precise distribution of the traffic based on real-time network conditions, e.g., available bandwidth, delay, etc. Also, the techniques described herein achieve the dynamic weighted-fair distribution without altering the SPT or the SPF algorithm. Further, the dynamic aspects of one or more embodiments described herein alleviate the need for cumbersome and inefficient manual configuration.

As those skilled in the art will appreciate, the embodiments described herein provide for dynamic weighted-fair load-balancing without changing the SPF algorithm or the best path. In particular, no loops are introduced by implementing the techniques described herein because the routing does not change, only the forwarding over the plurality of equal cost best paths (i.e., changing conventional "fair" load-balancing to dynamic "weighted-fair" load-balancing). Also, because the SPF algorithm remains the same, implementation of the embodiments described herein is relatively simple as compared to other techniques to account for "real-time" network conditions. For instance, an Internet Draft proposed by Villamizar entitled OSPF Optimized Multipath (OSPF-OMP) <draft-ietf-ospf-omp-0.2.txt>, dated February 1999 attempts to change the SPF algorithm based on link utilization. However, by changing the SPF algorithm, the proposal introduces substantial complexities, and may result in many network oscillations.

While there have been shown and described illustrative embodiments that efficiently forward traffic over equal cost best paths in a computer network (e.g., based on dynamic link attribute information), it is to be understood that various other adaptations and modifications may be made within the spirit and scope of the present invention. For example, the embodiments have been shown and described herein with reference to conventional SPF algorithms. However, the embodiments of the invention in their broader sense are not so limited, and may, in fact, be used with other SPF algorithms (e.g., constrained SPF, etc.), as will be understood by those skilled in the art.

The foregoing description has been directed to specific embodiments of this invention. It will be apparent, however, that other variations and modifications may be made to the described embodiments, with the attainment of some or all of their advantages. For instance, it is expressly contemplated that the components and/or elements described herein can be implemented as software, including a computer-readable medium having program instructions executing on a computer, hardware, firmware, or a combination thereof. Also, electromagnetic signals may be generated to carry computer executable instructions that implement aspects of the present invention over, e.g., a wireless data link or a data network, such as the Internet. Accordingly this description is to be taken only by way of example and not to otherwise limit the scope of the invention. Therefore, it is the object of the appended claims to cover all such variations and modifications as come within the true spirit and scope of the invention.

What is claimed is:

1. A method, comprising:
  identifying a plurality of equal cost best paths to a destination with a shortest path first (SPF) algorithm that uses associated cost values for paths, each of the equal cost best paths having a plurality of associated links;
  receiving, at a network node, dynamic link utilization information for the associated links, the dynamic link utilization information separate from the cost values used by the SPF algorithm to identify the equal cost best paths as having equal cost;
  for each of the equal cost best paths, determining a weakest link of the equal cost best path based on the dynamic link utilization information for all the links of the equal cost best path;
  comparing the link utilization of the weakest link of each of the equal cost best paths; and
  determining, at the network node, an amount of traffic to the destination to forward over each of the equal cost best paths, the amount of traffic to the destination to forward over each of the equal cost best paths being dynamically dependent upon the compared dynamic link utilization of the weakest link of each equal cost best path.

2. The method as in claim 1, further comprising:
receiving static link load capacity information for the associated links; and
determining an amount of traffic to the destination to forward over each of the equal cost best paths, the amount of traffic to the destination to forward over each of the equal cost best paths being dynamically dependent upon both the compared dynamic link utilization of the weakest link of each equal cost best path and the static link load capacity of the associated links for each equal cost best path.

3. The method as in claim 1, further comprising:
receiving dynamic link utilization information from one or more Interior Gateway Protocol (IGP) advertisements.

4. The method as in claim 3, wherein the IGP is a link state protocol.

5. The method as in claim 3, further comprising:
receiving the dynamic link utilization information from a Link Attribute field of the IGP advertisement.

6. The method as in claim 1, wherein the dynamic link utilization information is selected from a group consisting of: a current utilized bandwidth, a current available bandwidth, a current delay, a current error rate, and a current jitter.

7. The method as in claim 1, further comprising:
receiving dynamic link utilization information from a node when the dynamic link utilization information changes more than a configurable threshold at the node.

8. The method as in claim 1, further comprising:
receiving new dynamic link utilization information for the associated links; and
adjusting the amount of traffic to be forwarded to the destination over each of the equal cost best paths based on the new dynamic link utilization information for the associated links.

9. The method as in claim 8, further comprising:
adjusting the amount of traffic to be forwarded to the destination over each of the equal cost best paths in response to the new dynamic link utilization information having changed greater than a configurable threshold.

10. The method as in claim 8, further comprising:
adjusting the amount of traffic to be forwarded to the destination over each of the equal cost best paths after expiration of a configurable timer.

11. The method as in claim 1, wherein the weakest link is a link having a worst dynamic link utilization.

12. The method as in claim 11, wherein the worst dynamic link utilization is a smallest current available bandwidth.

13. The method as in claim 1, wherein the equal cost best paths are identified as Equal Cost Multiple Paths (ECMPs) by a routing protocol.

14. The method as in claim 1, further comprising:
maintaining the dynamic link utilization information for each associated link in a routing table.

15. The method as in claim 1, further comprising:
maintaining the amount of traffic to be forwarded to the destination over each of the equal cost best paths in a forwarding table.

16. A node, comprising:
one or more network interfaces adapted to receive dynamic link utilization information for links of a network;
a processor coupled to the one or more network interfaces and adapted to execute software processes; and
a memory adapted to store i) a routing process executable by the processor, the routing process configured to identify a plurality of equal cost best paths to a destination with a shortest path first (SPF) algorithm that uses associated cost values for paths, each of the equal cost best paths having a plurality of associated links, each link having corresponding dynamic link utilization information separate from the cost values used by the SPF algorithm to identify the equal cost best paths as having equal cost, and ii) a forwarding process executable by the processor, the forwarding process configured to, for each of the equal cost best paths, determine a weakest link of the equal cost best path based on the dynamic link utilization information for all the links of the equal cost best path, compare the link utilization information of the weakest link of each of the equal cost best paths, and determine an amount of traffic to the destination to forward over each of the equal cost best paths, the amount of traffic to the destination to forward over each of the equal cost best paths being dynamically dependent upon the compared dynamic link utilization of the weakest link of each equal cost best path.

17. The node as in claim 16, wherein the forwarding process is further configured to also utilize received static link load capacity information for the associated links in determination of the amount of traffic to the destination to forward over each of the equal cost best paths, the amount of traffic to the destination to forward over each of the equal cost best paths being dynamically dependent upon both the compared dynamic link utilization of the weakest link of each equal cost best path and the static link load capacity of the associated links for each equal cost best path.

18. The node as in claim 16, wherein the dynamic link utilization information is contained in one or more Interior Gateway Protocol (IGP) advertisements.

19. An apparatus, comprising:
means for identifying a plurality of equal cost best paths to a destination based on associated cost values for paths, each of the equal cost best paths having one or more associated links;
means for receiving dynamic link utilization information for the associated links, the dynamic link utilization information separate from the cost values used to identify the equal cost best paths as having equal cost;
means for determining, for each of the equal cost best paths, a weakest link of the equal cost best path based on the dynamic link utilization information for all the links of the equal cost best path;
means for comparing the link utilization of the weakest link of each of the equal cost best paths; and
means for determining an amount of traffic to the destination to forward over each of the equal cost best paths, the amount of traffic to the destination to forward over each of the equal cost best paths being dynamically dependent upon the compared dynamic link utilization of the weakest link of each equal cost best path.

20. A method, comprising:
receiving, at a network node, one or more advertisements including link cost values for links and dynamic link utilization information for links;
computing best paths to one or more destinations based on the link cost values using a shortest path first (SPF) algorithm;
identifying existence of a plurality of equal cost best paths to a particular destination, at least some of the plurality of equal cost best paths to the particular destination including a plurality of links;

for each of the plurality of equal cost best paths to the particular destination, determining a weakest link of the equal cost best path to the particular destination based on the dynamic link utilization information for all the links of the equal cost best path;

comparing the link utilization of the weakest link of each of the equal cost best paths to the particular destination;

determining an amount of traffic to forward to the particular destination over each of the equal cost best paths to the particular destination to be dynamically dependent upon the compared dynamic link utilization of the weakest link of each of the each equal cost best paths to the particular destination;

receiving, at the network node, new dynamic link utilization information; and adjust the amount of traffic to forward to the particular destination over each of the equal cost best paths to the particular destination, based on the new dynamic link utilization information.

21. The method as in claim 20, wherein the one or more advertisements are Interior Gateway Protocol (IGP) advertisements and the dynamic link utilization information is from a Link Attribute field of the IGP advertisements.

22. The method as in claim 20, wherein the weakest link of each of the equal cost best paths is a link with the smallest current available bandwidth on the respective path.

* * * * *